Patented Aug. 31, 1926.

1,598,167

UNITED STATES PATENT OFFICE.

ROBERT STOCKER, OF BASEL, AND JACOB MÜLLER, OF MUNCHENSTEIN, NEAR BASEL, SWITZERLAND, ASSIGNORS TO SOCIETY OF CHEMICAL INDUSTRY IN BASLE, OF BASEL, SWITZERLAND.

ANTHRACENE-2.1-THIOINDOXYL AND PROCESS OF MAKING THE SAME.

No Drawing. Application filed January 4, 1926, Serial No. 79,228, and in Switzerland January 14, 1925.

It has been found that a new anthracene-thioindoxyl derivative may be obtained as follows:

First condensing the 2-mercapto-anthracene with monohalogeno acetic acids, such as monochloro- or monobromo acetic acids to the 2-anthracene-thioglycolic acid, then converting the latter into the corresponding halide by treatment with a halide of an inorganic hydroxy acid, such as $PCl_5$ or $SOCl_2$, and finally condensing the halide of the 2-anthracene-thioglycolic acid thus obtained to the anthracene-2:1-thioindoxyl by means of condensing agents having an acid action, such as $AlCl_3$, $FeCl_3$, $ZnCl_2$, etc.

The new indoxyl corresponds with the formula:

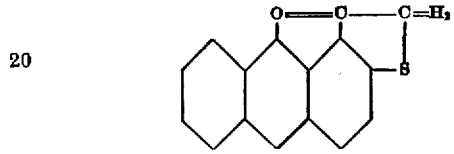

It forms a yellow powder, insoluble in water, soluble in dilute alkalies and the ordinary solvents, such as alcohol, acetone, benzene, etc. Crystallized from dilute alcohol it forms yellow needles melting at 172°.

*Example.*

21 parts of 2-mercapto-anthracene corresponding with the formula:

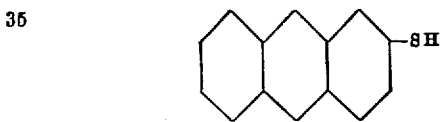

are dissolved at 80° C. in 1000 parts of water and 40 parts of caustic soda of 30% strength and treated with an exactly neutralized solution of 11 parts of monochloroacetic acid. The mixture is heated for some time at 70–80°, whereby the original orange coloration of the solution turns over to pale yellow. At the same time the sodium salt of anthracenethioglycolic acid begins partly to precipitate. The condensation being achieved, the hydrochloric acid is added to the mixture whereby the free 2-anthracene-thioglycolic acid corresponding with the formula:

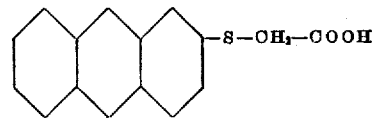

precipitates in yellowish white flakes. Crystallized once from benzene, the new product forms yellow needles melting at 105°.

26.8 parts of 2-anthracenethioglycolic acid are triturated with 22 parts of phosphorus penta-chloride. The mass liquefies with strong evolution of hydrochloric acid gas. The whole is allowed to rest for 15–30 minutes in a reflux apparatus on the boiling water bath until the formation of the acid chloride is achieved. The phosphorus oxychloride is then distilled off in a vacuum and the 2-anthracenethioglycolic acid chloride mixed with 150 parts of chlorobenzene. To this solution 21.5 parts of aluminium chloride are added, whereby its coloration turns over to red. The whole is heated for some hours until the evolution of hydrochloric acid is completed. The reaction product is introduced into a mixture of ice and hydrochloric acid and the solvent is distilled off with steam. The 2:1-anthracene thioindoxyl of the formula:

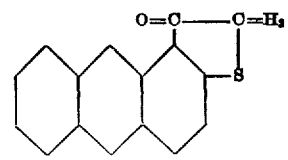

thus obtained is extracted from the solid residue with hot dilute caustic soda solution. The new compound is crystallized from dilute alcohol.

What we claim is:—

1. As step in the production of anthracene-2:1-thioindoxyl the condensation of the 2-mercaptoanthracene with monohalogenoacetic acids to the 2-anthracenethioglycolic acid.

2. As step in the production of anthracene-2:1-thioindoxyl the conversion of the anthracene-2-thioglycolic acid to the halide of the anthracene-2-thioglycolic acid by treatment with halides of inorganic hydroxy acids.

3. As step in the production of anthracene-2:1-thioindoxyl the treatment of the anthracene-2-thioglycolic acid halide with condensing agents having an acid action.

4. As new product the herein described new anthracene-2:1-thioindoxyl corresponding with the formula:

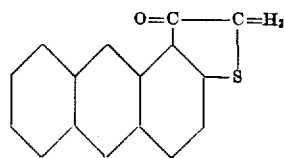

which product forms a yellow powder, insoluble in water, soluble in dilute alkalies and in alcohol, acetone and benzene, crystallizing from dilute alcohol forming yellow needles melting at 172° C.

In witness whereof we have hereunto signed our names this 19th day of December, 1925.

ROBERT STOCKER.
JACOB MÜLLER.

residue with hot dilute caustic soda solution. The new compound is crystallized from dilute alcohol.

What we claim is:—

1. As step in the production of anthracene-2:1-thioindoxyl the condensation of the 2-mercaptoanthracene with monohalogenoacetic acids to the 2-anthracenethioglycolic acid.

2. As step in the production of anthracene-2:1-thioindoxyl the conversion of the anthracene-2-thioglycolic acid to the halide of the anthracene-2-thioglycolic acid by treatment with halides of inorganic hydroxy acids.

3. As step in the production of anthracene-2:1-thioindoxyl the treatment of the anthracene-2-thioglycolic acid halide with condensing agents having an acid action.

4. As new product the herein described new anthracene-2:1-thioindoxyl corresponding with the formula:

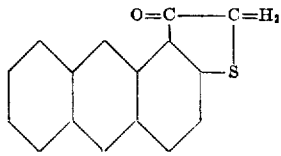

which product forms a yellow powder, insoluble in water, soluble in dilute alkalies and in alcohol, acetone and benzene, crystallizing from dilute alcohol forming yellow needles melting at 172° C.

In witness whereof we have hereunto signed our names this 19th day of December, 1925.

ROBERT STOCKER.
JACOB MÜLLER.

Certificate of Correction.

Patent No. 1,598,167, granted August 31, 1926, to

ROBERT STOCKER, of Basel, and JACOB MÜLLER, of Munchenstein, near Basel, Switzerland.

It is hereby certified that error appears in the printed specification of the above-mentioned patent requiring correction as follows: Page 1, lines 18–24, strike out the present formula and insert instead

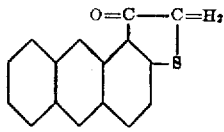

and that the said Letters Patent should be read with this correction therein that the same may conform to the record of the case in the Patent Office.

Signed and sealed this 1st day of March, A. D. 1927.

[SEAL.]
M. J. MOORE,
*Acting Commissioner of Patents.*

Certificate of Correction.

Patent No. 1,598,167, granted August 31, 1926, to

ROBERT STOCKER, of Basel, and JACOB MÜLLER, of Munchenstein, near Basel, Switzerland.

It is hereby certified that error appears in the printed specification of the above-mentioned patent requiring correction as follows: Page 1, lines 18–24, strike out the present formula and insert instead

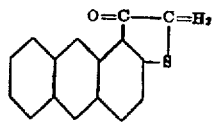

and that the said Letters Patent should be read with this correction therein that the same may conform to the record of the case in the Patent Office.

Signed and sealed this 1st day of March, A. D. 1927.

[SEAL.]

M. J. MOORE,
*Acting Commissioner of Patents.*